April 23, 1957 M. L. WOOD 2,789,766

RECORD CONTROLLED MACHINE

Filed Oct. 16, 1953 3 Sheets-Sheet 1

INVENTOR
MARION L. WOOD
BY [signature]
ATTORNEY

April 23, 1957 M. L. WOOD 2,789,766

RECORD CONTROLLED MACHINE

Filed Oct. 16, 1953 3 Sheets-Sheet 2

INVENTOR
MARION L. WOOD
BY [signature]
ATTORNEY

INVENTOR
MARION L. WOOD
BY [signature]
ATTORNEY

United States Patent Office 2,789,766

Patented Apr. 23, 1957

2,789,766

RECORD CONTROLLED MACHINE

Marion L. Wood, Highland, N. Y., assignor to International Business Machines Corporation, New York, N. Y., a corporation of New York Application October 16, 1953, Serial No. 386,600

11 Claims. (Cl. 235—92)

Figure 1A:
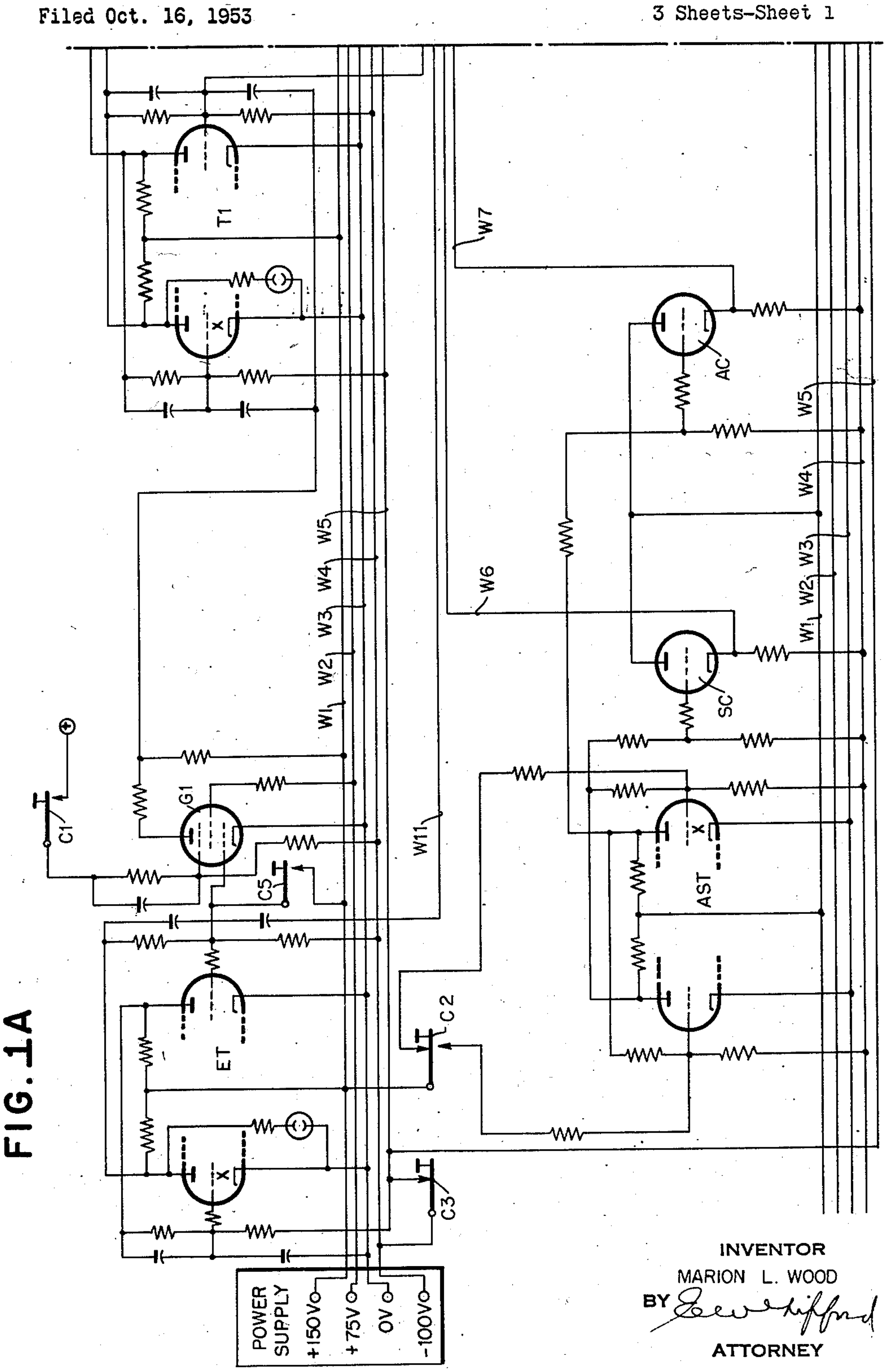

This invention relates to calculating machines and more particularly to registers suitable for use in electronic calculating machines.

An object is to provide an improved electronic register.

An object is to provide a suitable sign control for indicating when an electronic register has passed into a negative or a positive region.

An object is to provide an electronic register of the reversible, that is, adding and subtracting, type, with a sign control which indicates the nature or the status of the register at any time, that is, whether the value is positive or negative.

Other objects of the invention will be pointed out in the following description and claims and illustrated in the accompanying drawings, which disclose, by way of examples, the principle of the invention and the best mode, which has been contemplated, of applying that principle.

Figure 1B:
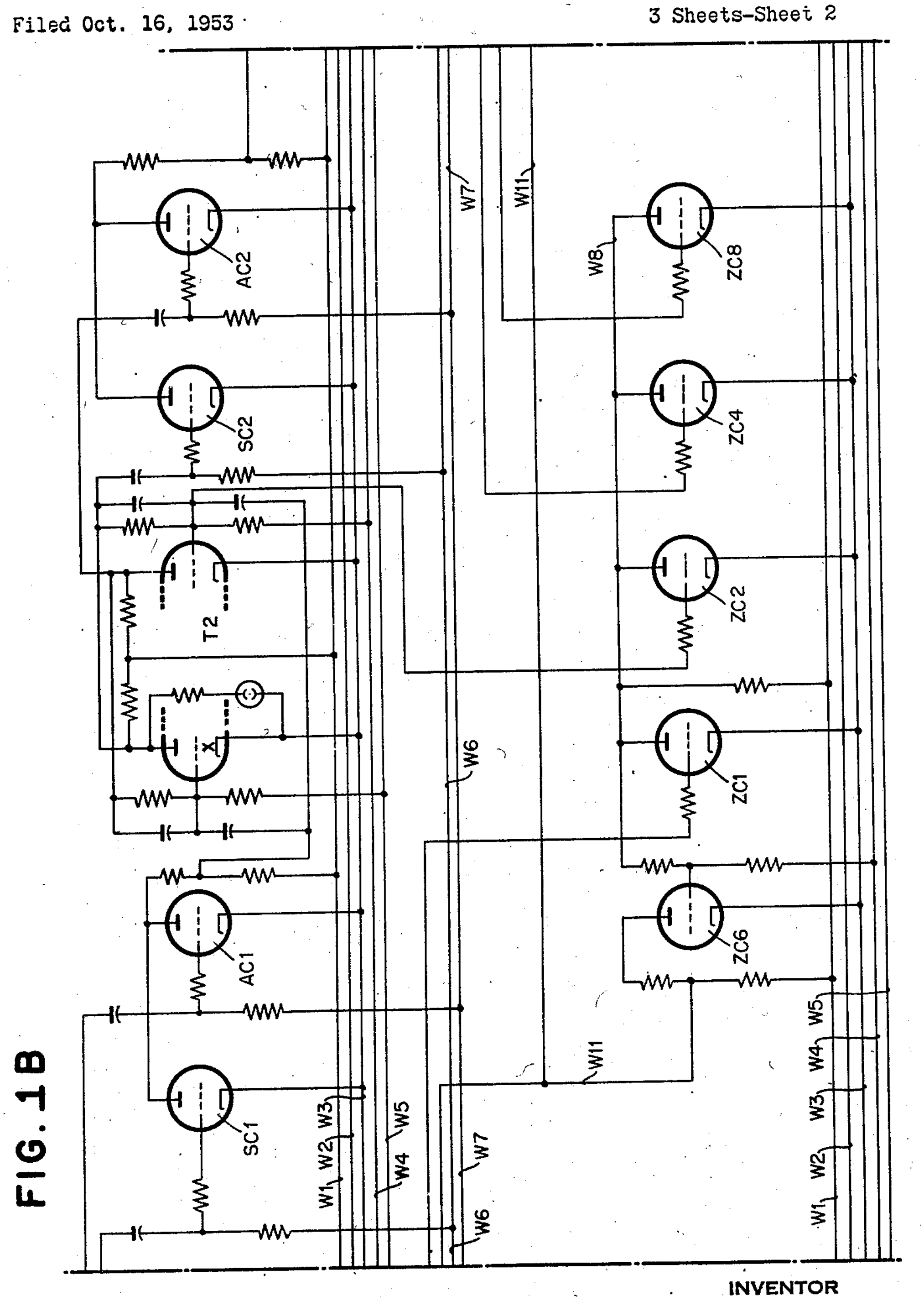
Figure 1C:
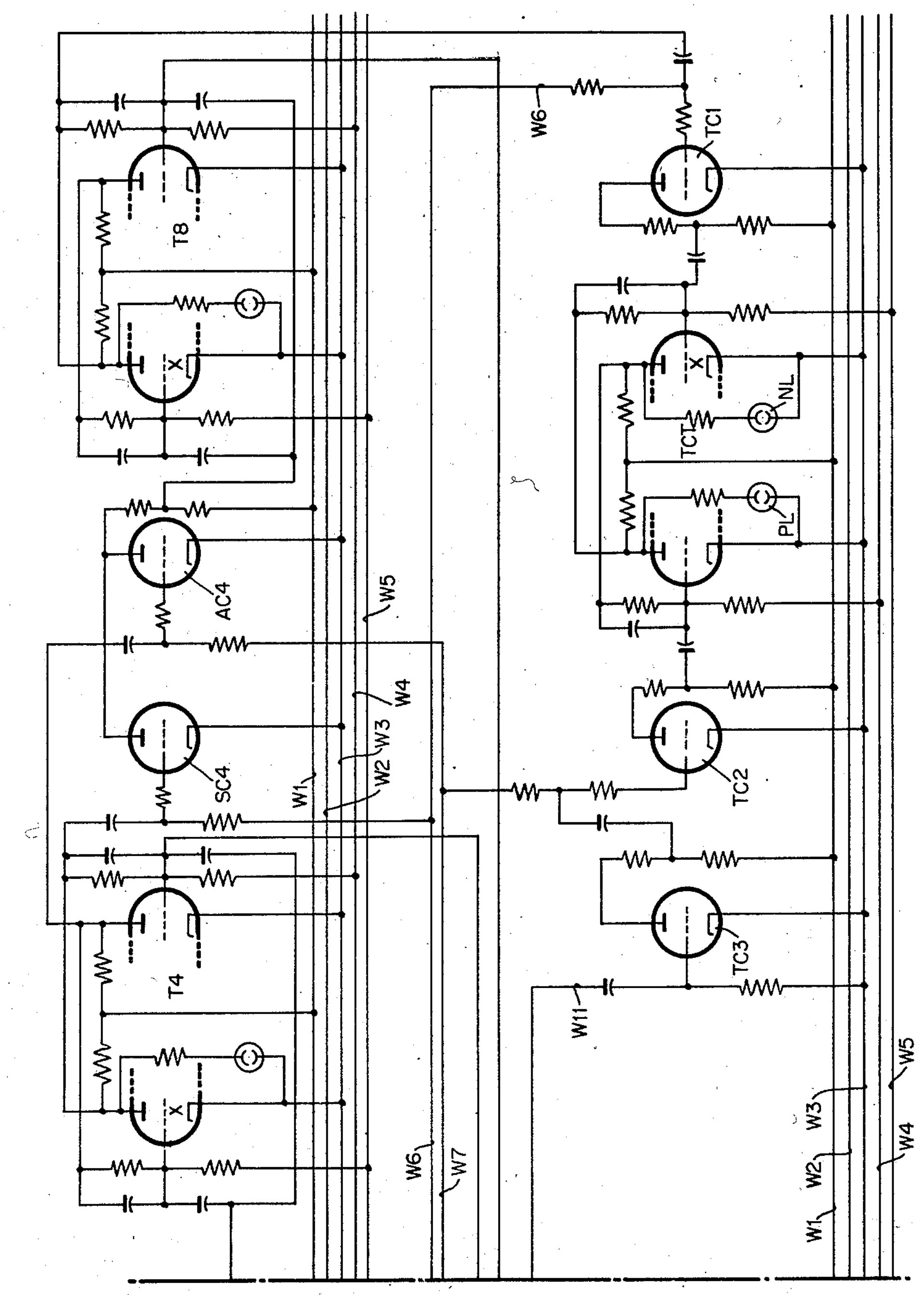

In the drawings:

Figs. 1A, 1B and 1C together comprise a wiring diagram of a binary type register embodying the present invention.

In the present case, for the purpose of illustrating the invention it has been shown as applied to a reversible binary register of the general type disclosed in copending application Serial No. 386,526, filed October 16, 1953, by A. H. Dickinson and P. E. Fox, which, however, has been simplified by eliminating the controls which correct or adjust the register to a decimal system of numbers.

In the present case it will be understood that the register may comprise an indefinite number of stages, but for purposes of simplicity in illustrating the invention it will be assumed that the register comprises only four binary stages ranging from $2^0$ to $2^4$.

In the above-mentioned application there is shown an electronic register of the modified decimal type, one in the quinary form and the other in the binary form, in which the digit representing trigger stages are intercoupled in cascade by means of adding and subtraction control tubes which are rendered selectively effective according to whether the operation is to be addition or subtraction to cross-couple the stages for the appropriate operation. Since the general construction and operation of the register is fully described in the above application, the disclosure in the present case will be largely limited to an explanation of how the sign control functions. It will be understood, however, that the sign control disclosed in the present application may be combined with either a reversible quinary or a reversible binary type register such as disclosed in the above application without alteration thereof. The register in the present case is equipped with a suitable zero control which indicates when the respective stages of the register collectively reach the zero status and the zero control in the present case is utilized to give an indication of the status of the register as a whole whether the value retained therein is positive or negative.

In the drawings the register includes the binary stage triggers T1, T2, T4, T8 which are coupled in cascade by the adding and subtraction control tubes designated AC1, AC2, AC4 for adding and the tubes SC1, SC2, SC4 for subtraction. These tubes function in the same manner as disclosed in the above application by acting as switch tubes to couple the triggers T1, T2, T4, T8 for addition or subtraction and are controlled by the status of the cathode follower control tubes AC and SC. The latter tubes in turn are rendered conductive and non-conductive respectively as described in the above application by an add-subtract trigger AST which is, in its turn, controlled by the add-subtract switch C2. This switch may be operated mechanically, as in the above application, electronically, or it may be manually operated. When the switch C2 is in its lower position, the left hand side of trigger AST is made conductive thus cutting "off" tube SC and rendering tube AC conductive. As a result, the cathode potential of tube AC and the potential on wire W7 rises and primes the grids of the tubes AC1, AC2, AC4 to a little below cut-off thereby conditioning the aforesaid tubes for conduction when a positive pulse is applied thereto from the right hand anodes of the triggers T1, T2, T4. Similarly, when the switch C2 is placed in upper position, as in Fig. 1A, the conditions are reversed and tube SC is rendered conductive with a consequent rise in its cathode potential and the potential on wire W6 primes the grids of the tubes SC1, SC2, SC4 for conduction.

For purposes of simplicity in disclosing the invention, the group of correcting tubes which are designated AC6, AC7, AC8 and SC6, SC7, SC8, which were utilized in the above application to correct the values to the decimal system in both the quinary and binary forms of register, are here omitted so that the register, insofar as the trigger stages T1, T2, T4, T8 are concerned, function similarly to an ordinary binary register modified in the manner explained in the above application in which the tubes SC1, SC2, AC1, AC2, etc., function not only as switches but also as inverters to produce the negative pulses necessary to change the status of the triggers T1, T2, T4, T8.

For example, if the register is set for addition with tube AC conducting, the tube AC1 will be primed. Consequently, the tube AC1 can now be rendered conductive to pass a negative pulse to the trigger T2 only when the trigger T1 goes from "on" to "off" status, indicated by the capital letter "X" placed between the grids of the cathodes respectively of the register triggers. Similarly, when the tube SC1 is rendered conductive, a negative pulse will be passed to the trigger T2 only when the trigger T1 goes to "on" status.

In order to explain the operation of the register, the progression of the register through a sequence which involves passage through zero from positive to positive, from positive to negative, from negative to positive, and from negative to negative, will be shown.

The following table shows the effect of adding 17 pulses to the register after it has been initially reset to zero:

*Table I.—Adding*

| Pulse | Value Registered | Register Trigger Status | | | | Sign Control Tubes | | | |
|---|---|---|---|---|---|---|---|---|---|
| | | T1 | T2 | T4 | T8 | TC1 | TC2 | TC3 | TCT |
| | 0 | 0 | 0 | 0 | 0 | NP | P | C | 0 |
| 1 | 1 | X | 0 | 0 | 0 | NP | P | C | 0 |
| 2 | 2 | 0 | X | 0 | 0 | NP | P | C | 0 |
| 3 | 3 | X | X | 0 | 0 | NP | P | C | 0 |
| 4 | 4 | 0 | 0 | X | 0 | NP | P | C | 0 |
| 5 | 5 | X | 0 | X | 0 | NP | P | C | 0 |
| 6 | 6 | 0 | X | X | 0 | NP | P | C | 0 |
| 7 | 7 | X | X | X | 0 | NP | P | C | 0 |
| 8 | 8 | 0 | 0 | 0 | X | NP | P | C | 0 |
| 9 | 9 | X | 0 | 0 | X | NP | P | C | 0 |
| 10 | 10 | 0 | X | 0 | X | NP | P | C | 0 |
| 11 | 11 | X | X | 0 | X | NP | P | C | 0 |
| 12 | 12 | 0 | 0 | X | X | NP | P | C | 0 |
| 13 | 13 | X | 0 | X | X | NP | P | C | 0 |
| 14 | 14 | 0 | X | X | X | NP | P | C | 0 |
| 15 | 15 | X | X | X | X | NP | P | C | 0 |
| 16 | 0 | 0 | 0 | 0 | 0 | NP | −Pulse | +Pulse | 0 |
| 17 | 1 | X | 0 | 0 | 0 | NP | P | C | 0 |

Since the functioning of the register is generally the same as in any other binary register, except for the inversion effects of the tubes SC1, SC2, AC1, AC2, etc., it is apparent that nothing happens, insofar as the tubes TC1, TC2, TC3 and trigger TCT are concerned, provided the register remains positive.

The conditioning of the register for addition or subtraction through the wires W6, W7 selectively primes the tubes TC1, TC2 according to whether the operation is subtraction or addition. In the above table the priming condition is indicated by the letter "P" meaning "primed" and the letters "NP" meaning "not primed."

When the first adding pulse is entered, at least one of the zero control tubes ZC1, ZC2, ZC4, ZC8 will be rendered conductive and will cut off tube ZC6 thereby passing a positive pulse over wire W11 to the tube TC3 which has no effect since this tube is normally conductive. The trigger TCT remains in "off" status with its right hand side conductive. Therefore, the positive indicator light PL will be lighted and the negative light NL extinguished due to the fact that only the voltage drop across the left hand triode of trigger TCT is high enough for ignition of a lamp. So long as the register continues to add there can be no change of status of the trigger TCT.

On the sixteenth pulse, the register will go to zero, all of the tubes ZC1, ZC2, ZC4, ZC8 will be cut off, and a negative pulse will be produced on wire W11 by tube ZC6 which cuts off tube TC3 and the positive pulse produced on its anode causes tube TC2 to conduct, but this has no effect because, while tube TC2 is primed for this operation, the negative pulse which it produces can have no effect on the trigger TCT since this trigger is already cut off on the left hand side. If more adding pulses are applied to the register, it will then progress through the same sequence as shown in the above table.

Now let it be assumed that the register is conditioned for subtraction and the tubes SC1, SC2, SC4 and TC1 are primed. The following table shows a sequence comprising a series of seventeen subtracting pulses which first carry the register to zero and to a "15" followed by a single subtracting pulse which carries the register back to zero:

*Table II.—Subtracting*

| Pulse | Value Registered | Register Trigger Status | | | | Sign Control Tubes | | | |
|---|---|---|---|---|---|---|---|---|---|
| | | T1 | T2 | T4 | T8 | TC1 | TC2 | TC3 | TCT |
| | 0 | 0 | 0 | 0 | 0 | P | NP | C | 0 |
| 1 | 15 | X | X | X | X | −Pulse | NP | C | X |
| 2 | 14 | 0 | X | X | X | P | NP | C | X |
| 3 | 13 | X | 0 | X | X | P | NP | C | X |
| 4 | 12 | 0 | 0 | X | X | P | NP | C | X |
| 5 | 11 | X | X | 0 | X | P | NP | C | X |
| 6 | 10 | 0 | X | 0 | X | P | NP | C | X |
| 7 | 9 | X | 0 | 0 | X | P | NP | C | X |
| 8 | 8 | 0 | 0 | 0 | X | P | NP | C | X |
| 9 | 7 | X | X | X | 0 | P | NP | C | X |
| 10 | 6 | 0 | X | X | 0 | P | NP | C | X |
| 11 | 5 | X | 0 | X | 0 | P | NP | C | X |
| 12 | 4 | 0 | 0 | X | 0 | P | NP | C | X |
| 13 | 3 | X | X | 0 | 0 | P | NP | C | X |
| 14 | 2 | 0 | X | 0 | 0 | P | NP | C | X |
| 15 | 1 | X | 0 | 0 | 0 | P | NP | C | X |
| 16 | 0 | 0 | 0 | 0 | 0 | P | NP | +Pulse | X |
| 17 | 15 | X | X | X | X | −Pulse | NP | C | X |
| 18 | 0 | 0 | 0 | 0 | 0 | P | NP | C | X |

The first pulse will turn all of the triggers T1, T2, T4, T8 "on" and, as was seen above, this will cause tube ZC6 to be cut off and a positive pulse applied to wire W11 which again has no effect. However, trigger T8 produces a positive pulse which, applied to the grid of the inverter tube TC1, produces a negative pulse which is applied to the right hand grid of trigger TCT changing it from "off" status to "on" status with the left side conductive. This causes the negative light NL to light and the positive light PL to become extinguished. The trigger stages now will change status, regressing from 15 to 0, according to the table, when the remaining fifteen subtracting pulses are applied necessary to carry the register back to zero. When one or more subtracting pulses are now applied to the register, all of the triggers T1, T2, T4, T8 first will be turned back "on" again and the positive pulse produced by trigger T8 will again cause a negative pulse to be applied to the right hand grid of trigger TCT but, since this side of the triger is now cut off, it has no effect. It will thus be seen that, as long as the operation continues consistently adding or consistently subtracting, the status of trigger TCT is not changed after the initial change involved in passing from the positive indication of lamp PL to the negative indication of lamp NL, or vice versa.

Let it now be assumed that a value is added to the register of sufficient value to carry it through zero back into the adding indication, for example, the value "2," and that the switch SW has been set to "add." The first adding pulse will turn "off" all of the triggers T1, T2, T4, T8. The tube ZC6 is now rendered conductive in consequence of the register going to zero, producing a negative pulse on wire W11 which momentarily cuts off tube TC3 producing a positive pulse which is inverted by tube TC2 to a negative pulse applied to the left hand grid of trigger TCT thus turning trigger TCT "off" with the right side conductive, extinguishing the light NL, and igniting the light PL, indicating that the register is now in the positive region.

In the drawings there has been shown a simple means of utilizing the sign control comprising a pair of indicator lights which show when the register is in the positive and negative regions respectively. However, it will be understood that the trigger TCT may be coupled to some other electronic control as, for example, in an electronic dividing machine the status of the trigger TCT may be used to control on overdraft in various known ways.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. An electronic register having a series of trigger stages representing by different ones of a plurality of stable states, one of which represents zero, different components of a number system, the sum of any combination of said states representing a term in said system, means to apply entry pulses to one of said stages to enter values in said orders, means to couple said stages for control of addition and subtraction including a plurality of add switch tubes for coupling said stages for addition and a plurality of subtract switch tubes for coupling said stages for subtraction, a series of zero control tubes, each responding to a change to zero state of one of said stages, a sign designating trigger having two stable states one representing that the register is adding and the other that the register is subtracting, a pair of add-subtract switch tubes, one of said switch tubes being rendered effective by one of said trigger stages to shift said sign designating trigger to one state to designate that the register is going negative and the other rendered effective by said zero control tubes to designate that the register is going positive, and means to selectively condition for operation said add switch tube or the subtract switch tube.

2. An electronic register comprising a series of trigger stages representing, by different ones of a plurality of stable states, zero and different components of a binary system, the sum of any combination of said states representing a digital value in a binary system of numbers, means to apply entry pulses to at least one of said stages in each order to enter digital values in said orders, means to couple said stages for control of addition and subtration including a plurality of add switch tubes for coupling said stages for binary addition and a plurality of subtract switch tubes for coupling said stages for binary subtraction, a sign control circuit having two alternate selectively settable stable states, one designating addition and the other designating subtraction; a pair of sign switch tubes, one for addition and rendered operative in response to the zero states of all of said trigger stages to select the adding stable state and the other responsive to a value representing state of a predetermined one of said trigger stages for selecting the subtracting stable state of the sign designating circuit, and means to condition for operation either the add switch tubes and the add sign switch tubes or the subtract switch tubes and the subtract sign switch tubes.

3. In combination, an electronic register comprising a series of trigger stages representing by changes of state zero and the components of a non-decimal system of numbers; circuit means interconnecting said stages in cascade for functioning to register the successive terms of said non-decimal system of numbers including separate coupling means for addition and subtraction, said stages, when coupled in cascade by one or the other of said separate coupling means functioning as a complete register to accumulate values in accordance with said non-decimal system; means to selectively render one or the other of said coupling means effective; and means, including a sign designating element, rendered operative by a change of state of a predetermined one of said stages to designate a predetermined value or by change of all of said stages to zero state, according to whether the coupling means are selectively rendered effective for addition or subtraction, for designating the sign of the value registered.

4. An electronic register comprising a series of bistable trigger stages, each trigger stage having adding and subtracting outputs and a common input, a predetermined one of the stable states of each trigger stage in said series representing one of a series of basic components of a non-decimal number series; electronic add-subtract control means for conditioning said orders for either addition or subtraction including a series of addition coupling tubes and a series of subtraction coupling tubes, an addition coupling tube and a subtraction coupling tube coupling the common input of each succeeding trigger stage in the series to the outputs of the preceding stages to connect each series of stages in cascade for operation as a single register, means to pulse the common input of the first stage of said series to effect entries of values, add-subtract control means to selectively render effective either the addition coupling tubes or the subtraction coupling tubes, a bistable sign control trigger normally representing by one of its stable states that the sign of a registered value is positive or negative; and means for changing the sign control trigger from one stable state to the other including a zero detection circuit for shifting the sign control trigger to positive status and a circuit connected to the subtracting output of a predetermined trigger stage for shifting the sign control trigger to negative status.

5. An electronic register comprising a series of bistable trigger stages representing a series of component values of a number system arranged in numerical order for cascade operation with input to a lowest valued component stage, each trigger stage having two outputs, one for add and the other for subtract, and a common input, one stable state of each trigger representing zero and the other stable state a component value; selectively conditionable interstage coupling circuits for selectively connecting the add and subtract outputs of each stage to the common input of the next higher component value stage to render the latter stage responsive to one or the other of the outputs of the preceding stage upon a change of state of the preceding stage according to whether the coupling circuits have been selectively conditioned for add or subtract operation; a bistable sign designating trigger, and means responsive to a predetermined change of stable state of all of said trigger stages to render the sign designating trigger effective to designate that the register is of one sign and responsive to a different change of state of a predetermined one of said stages to render said sign designating trigger effective to designate that the register is of opposite sign.

6. An electronic register comprising a series of bistable triggers, each trigger having "off" and "on" stable states and representing, when in "on" status, different component values which, singly or in combination, represent the successive values of a continuous series of numbers, each trigger having a single input and two outputs, one output for addition and the other for subtraction, each order having a series of add coupling tubes for connecting the add outputs of said triggers to the inputs of the next triggers in the series and a series of subtract coupling tubes for connecting the subtract outputs of said triggers to the inputs of the next triggers in the series, for operation of the triggers in cascade for addition or subtraction as a counter according to said series of numbers, a series of zero test circuits responsive to changes of said triggers to "off" status, a sign control trigger having two separate inputs, means for coupling the zero test circuits to one input the sign control trigger including an add switch tube, means for coupling the other input of the sign control trigger to the subtract output of a predetermined one of said stages, and means for selectively conditioning for operation either the add coupling tubes and add switch tube or the subtract coupling tubes and subtract coupling tube.

7. In combination, an electronic register of the binary type having a series of bistable register trigger stages representing by one stable state the component values 1, 2, 4, 8 of a binary system of numbers and zero by the other state, means to couple the stages in cascade for operation as a binary counter, said coupling means being selectively reversible for either forward or reverse counting; means to reverse the coupling means; a bistable sign designating trigger, circuit means responsive to the zero stable state of the register triggers for placing the sign designating trigger in one of its stable states, circuit means responsive to the "8" register trigger when in said one stable state, and said coupling means is reversed, for placing the sign designating trigger in its other stable state, said circuit means being selectively conditioned for operation by said reversing means.

8. In combination, an electronic register having a plurality of component value trigger stages and means to couple the stages in cascade for operation as a counter, said coupling means being selectively reversible for either forward or reverse counting, means to selectively reverse the coupling means, zero detecting circuit means responsive to zero status of the component value triggers, circuit means responsive to a non-zero state of a predetermined component value trigger stage; and a sign designating circuit having two alternative settings, one determined by the zero detecting circuit means and the other made effective by the second circuit means when the coupling means is reversed.

9. In combination, an electronic register comprising a series of trigger stages representing by different stable states zero and the components of a binary system of numbers, normally ineffective means intercoupling said stages in cascade for functioning as a binary register including selective electronic switching means, one for coupling said orders for addition and the other for coupling said orders for subtraction, means to render one or the other of said switching means effective, a sign control trigger having two inputs, zero detecting circuits responsive to the zero stable state including a zero integrating tube and an add switch tube for coupling the integrating tube to one of the inputs of the sign control trigger, a switch tube coupling a predetermined one of said trigger stages to the other input of the sign control trigger, said switch tubes being selectively rendered effective for addition or subtraction.

10. An electronic register comprising a plurality of polystable trigger stages representing numerical values and zero in the binary system by different stable states, means to cross couple said stages in cascade for the operation of binary addition and binary subtraction and selectively conditionable for one or the other of said operations, a sign control trigger having two stable states representing said operations, circuit means responsive to a change to the zero stable state of said stages, when all of said stages are coupled for binary addition, to cause the sign control trigger to assume addition representing state, and circuit means responsive to a change to a predetermined binary value representing state of a predetermined one of said stages, when all of said stages are coupled for subtraction, to cause the sign control trigger to assume subtraction representing state.

11. An electronic register comprising a plurality of polystable trigger stages representing numerical values and zero by different stable states, means to cross couple said stages in cascade for the operation of addition and subtraction and selectively conditionable for one or the other of said operations, a sign control trigger having two stable states representing said operations, circuit means responsive to a change to the zero stable state of said stages, when all of said stages are coupled for addition, to cause the sign control trigger to assume addition representing state, and circuit means responsive to a change to a predetermined value representing state of a predetermined one of said stages, when all of said stages are coupled for subtraction, to cause the sign control trigger to assume subtraction representing state.

References Cited in the file of this patent

UNITED STATES PATENTS

| | | |
|---|---|---|
| 2,500,294 | Phelps | Mar. 14, 1950 |
| 2,621,854 | Sprague et al. | Dec. 16, 1952 |
| 2,624,508 | Dickinson et al. | Jan. 6, 1953 |
| 2,656,106 | Stabler | Oct. 20, 1953 |

FOREIGN PATENTS

| | | |
|---|---|---|
| 975,941 | France | Oct. 17, 1950 |